United States Patent [19]
Kishibuchi et al.

[11] Patent Number: 5,899,811
[45] Date of Patent: May 4, 1999

[54] DEVICE FOR TRANSMITTING ROTATIONAL POWER

[75] Inventors: Akira Kishibuchi, Nagoya; Kiyomi Okuda, Kariya; Yasuo Takahara, Anjo, all of Japan

[73] Assignee: Denso Corporation, Kariya, Japan

[21] Appl. No.: 08/807,393

[22] Filed: Feb. 27, 1997

[30] Foreign Application Priority Data

| Feb. 29, 1996 | [JP] | Japan | 8-043498 |
| Jan. 6, 1997 | [JP] | Japan | 9-000332 |

[51] Int. Cl.⁶ .................................................. F16D 3/76
[52] U.S. Cl. .................................................. 464/30; 464/89
[58] Field of Search .................................. 192/55.3, 209, 192/55.2; 464/30, 51, 87, 98, 89

[56] References Cited

U.S. PATENT DOCUMENTS

| 2,164,485 | 7/1939 | Yantis . | |
| 3,088,332 | 5/1963 | Arnt, Jr. | 464/89 |
| 3,199,313 | 8/1965 | Paulsen . | |
| 3,406,583 | 10/1968 | Baier | 464/30 |
| 3,618,310 | 11/1971 | Balchunas . | |
| 4,667,530 | 5/1987 | Mettler et al. | 464/89 |
| 5,195,625 | 3/1993 | Chang et al. . | |
| 5,219,273 | 6/1993 | Chang . | |
| 5,452,622 | 9/1995 | Fenelon | 464/87 |
| 5,460,574 | 10/1995 | Hobaugh | 464/89 |
| 5,683,299 | 11/1997 | Kishibuchi et al. | 464/88 |

FOREIGN PATENT DOCUMENTS

| 0 590 794 A2 | 4/1994 | European Pat. Off. . |
| 702167 | 3/1996 | European Pat. Off. . |
| 965155 | 9/1950 | France . |
| 2146778 | 3/1973 | France . |
| 2353475 | 10/1974 | Germany . |
| 6-109031 | 4/1994 | Japan . |
| 6-14104 | 4/1994 | Japan . |
| 8-135686 | 5/1996 | Japan . |
| 8-135752 | 5/1996 | Japan . |
| 2 138 893 | 10/1984 | United Kingdom . |
| 82/00183 | 1/1982 | WIPO . |

Primary Examiner—Eileen Dunn Lillis
Attorney, Agent, or Firm—Pillsbury, Madison & Sutro, LLP

[57] ABSTRACT

A device for transmitting rotational power from an automobile engine to a compressor for use in an automobile air conditioning system is provided. The device includes a pulley, which is supported on a housing of the compressor for rotation, for receiving rotational power from the automobile engine, and a hub connected to the drive shaft. At least one elastic member which defines outer and inner peripheral surfaces is provided. A first holder member is provided along the outer periphery of the hub for holding the elastic member. A second holder member, which is connected to the pulley, is provided for holding the elastic member. The first and second holder members radially cooperate with each other to circumferentially hold the elastic member during normal operation to transmit the rotation. The first and second holder members are disconnected by deformation of the at least one elastic member when a relative rotation between the pulley and drive shaft occurs. The connecting member and the first holder member define a relief clearance therebetween for facilitating the deformation of the at least one connecting member.

2 Claims, 13 Drawing Sheets

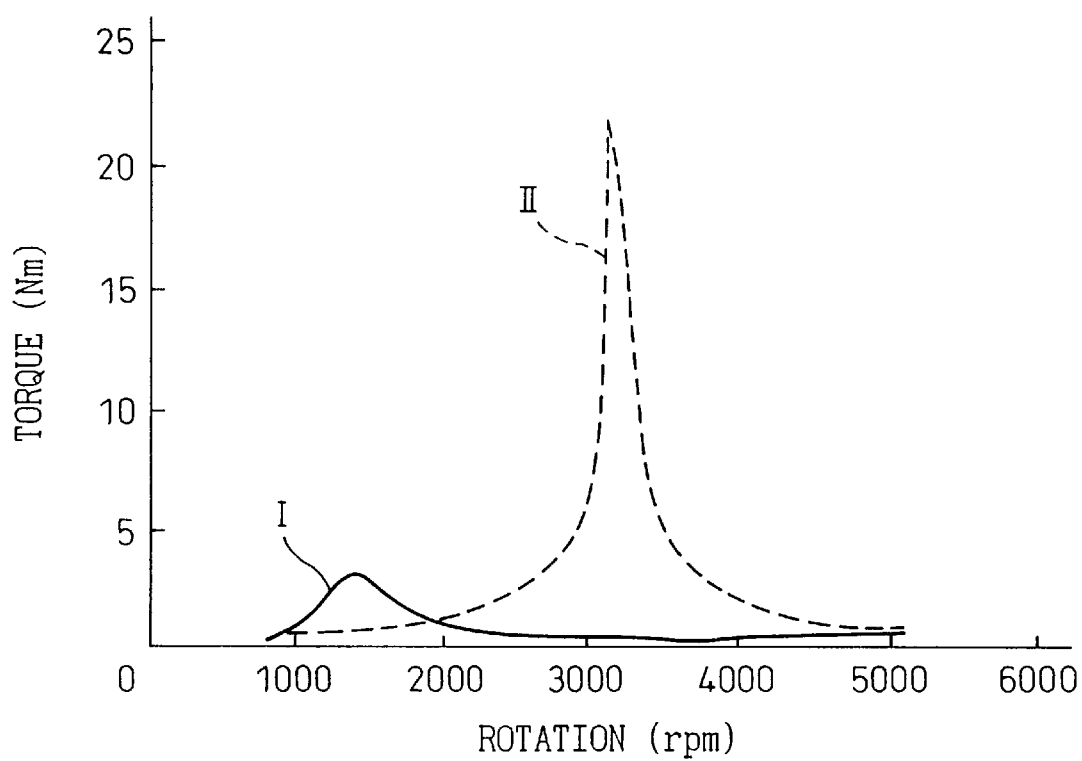

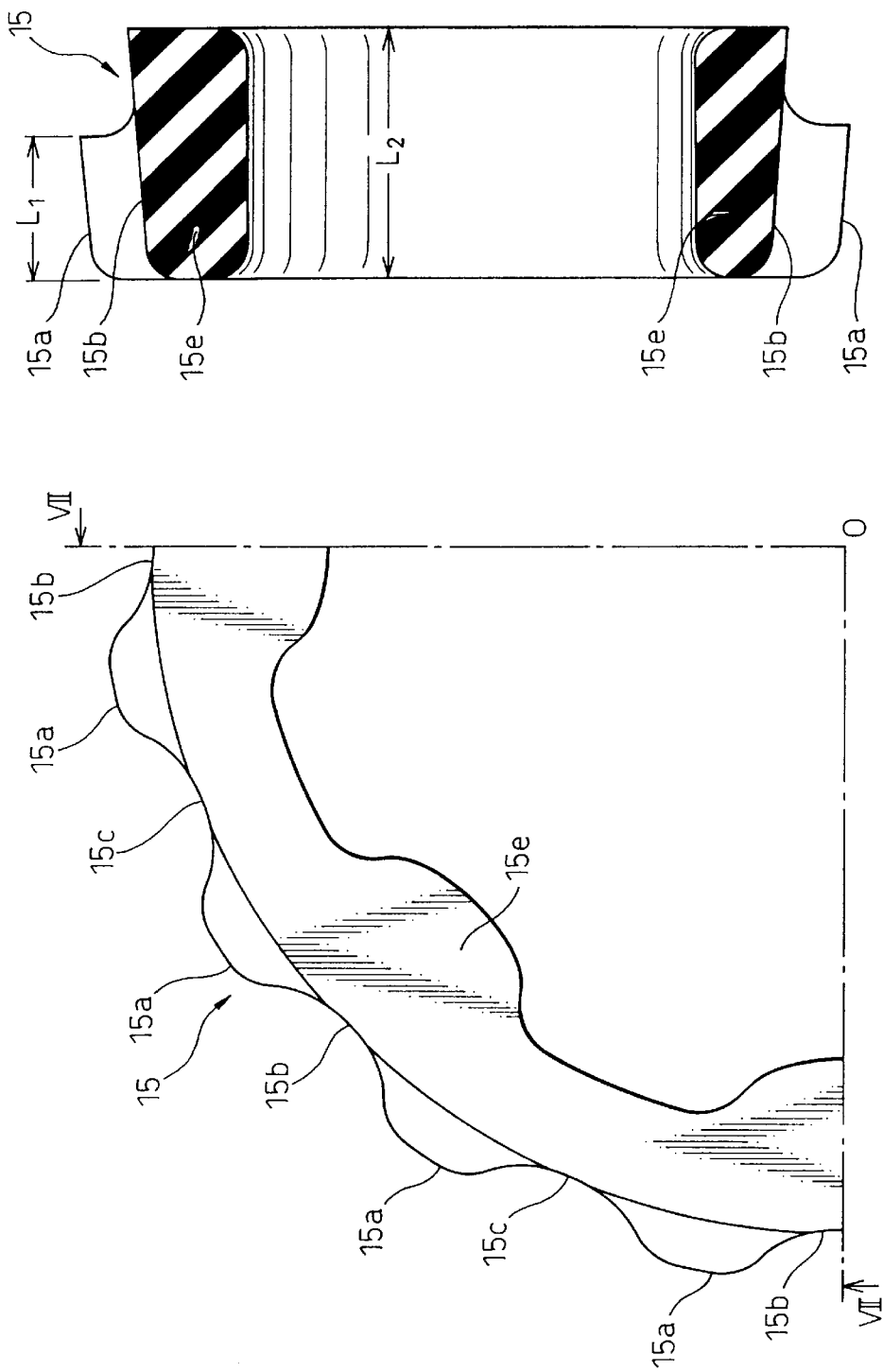

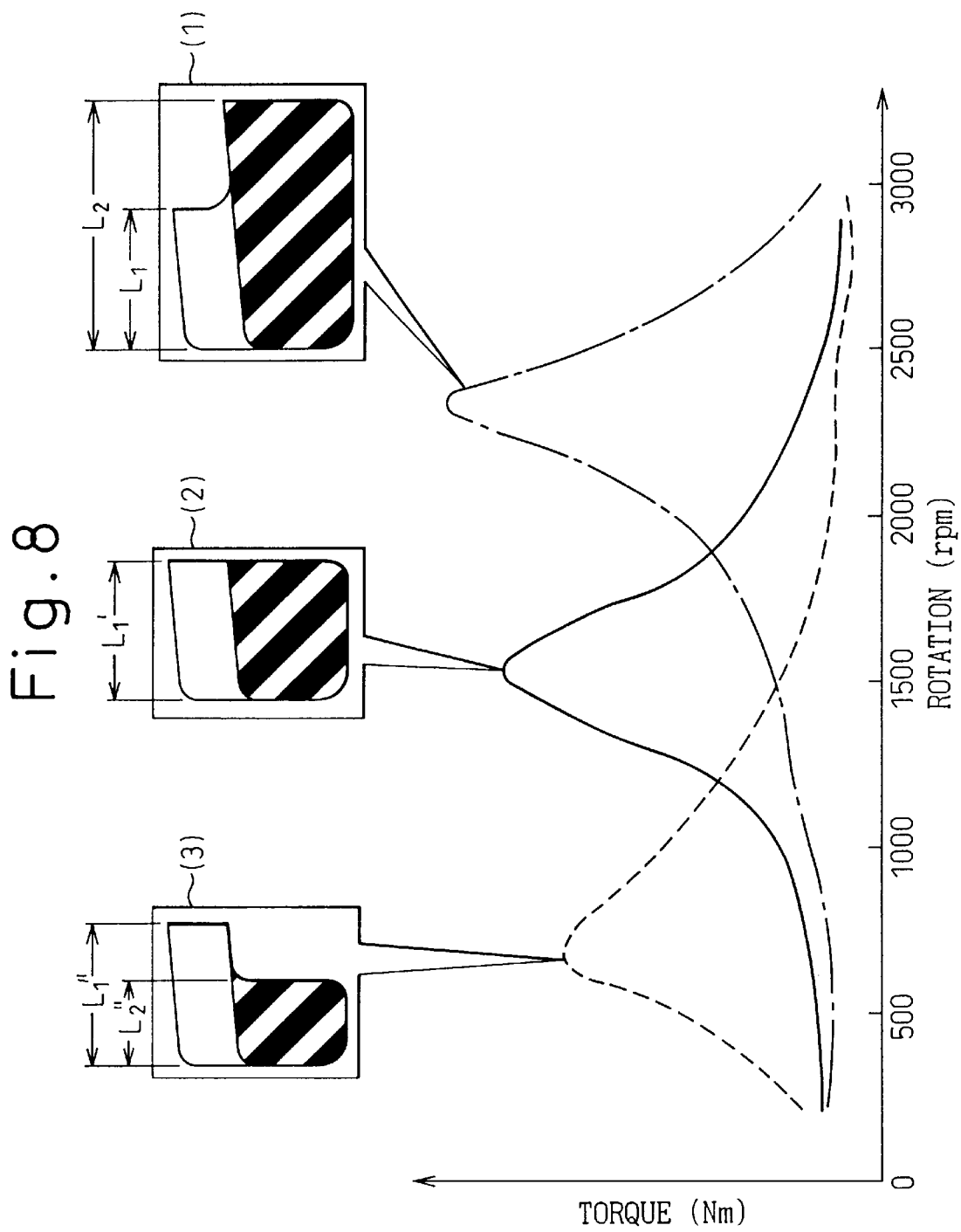

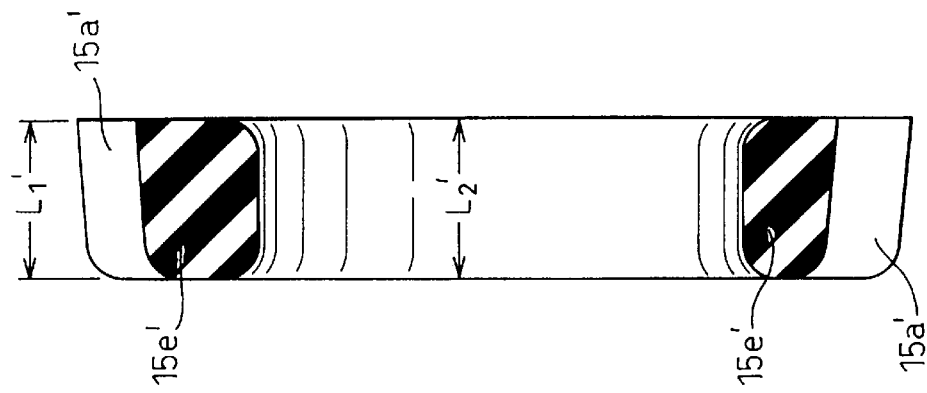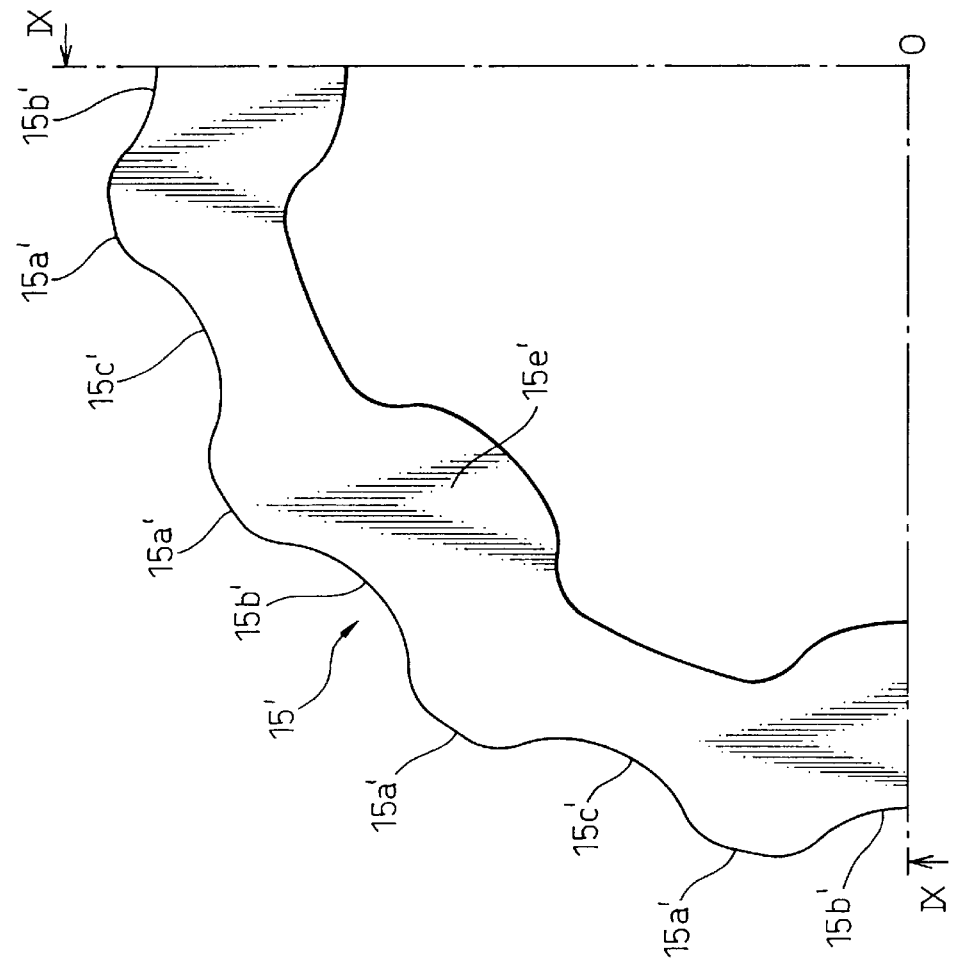

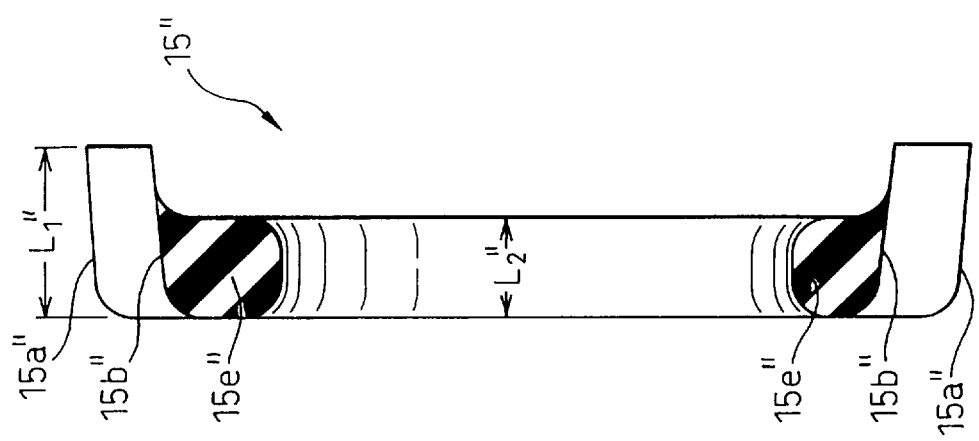
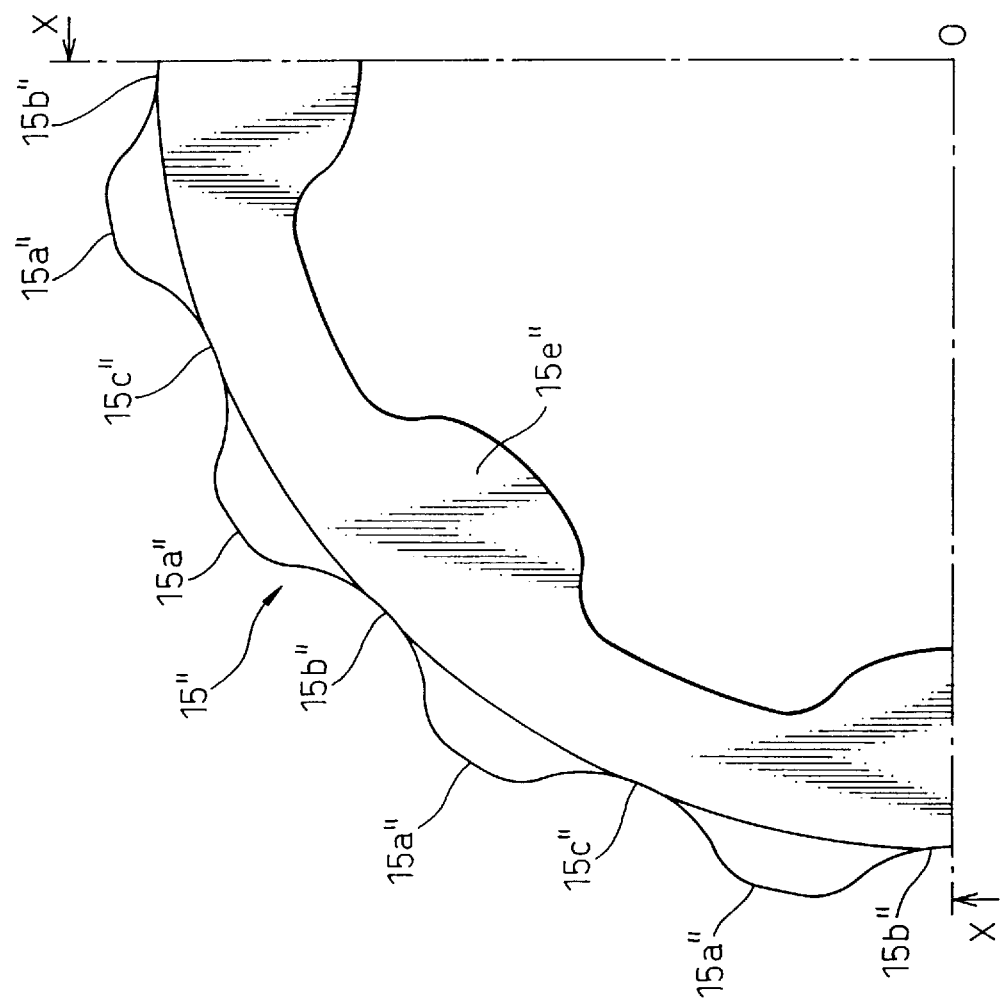

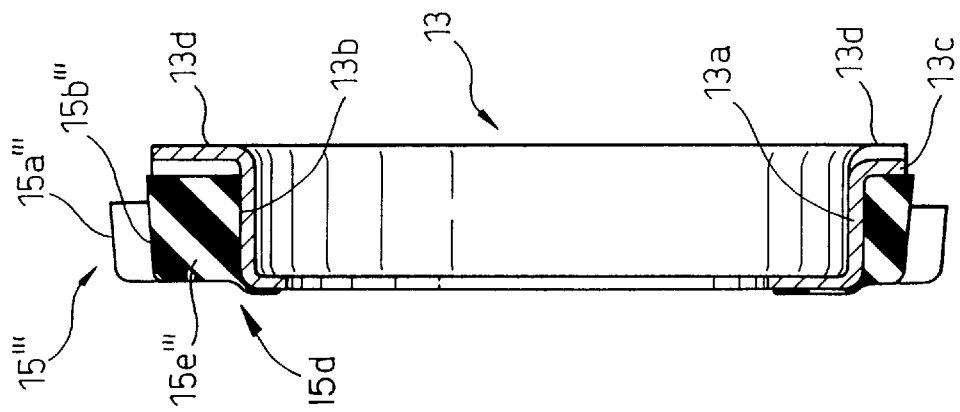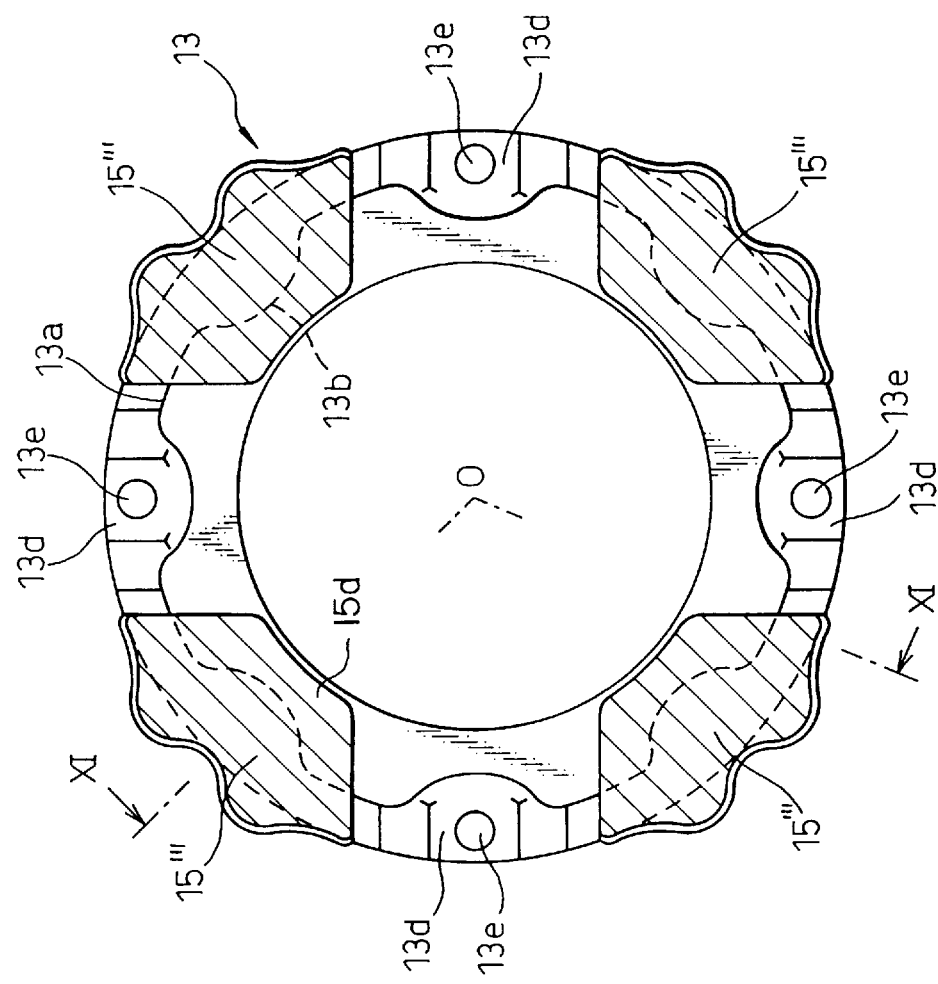

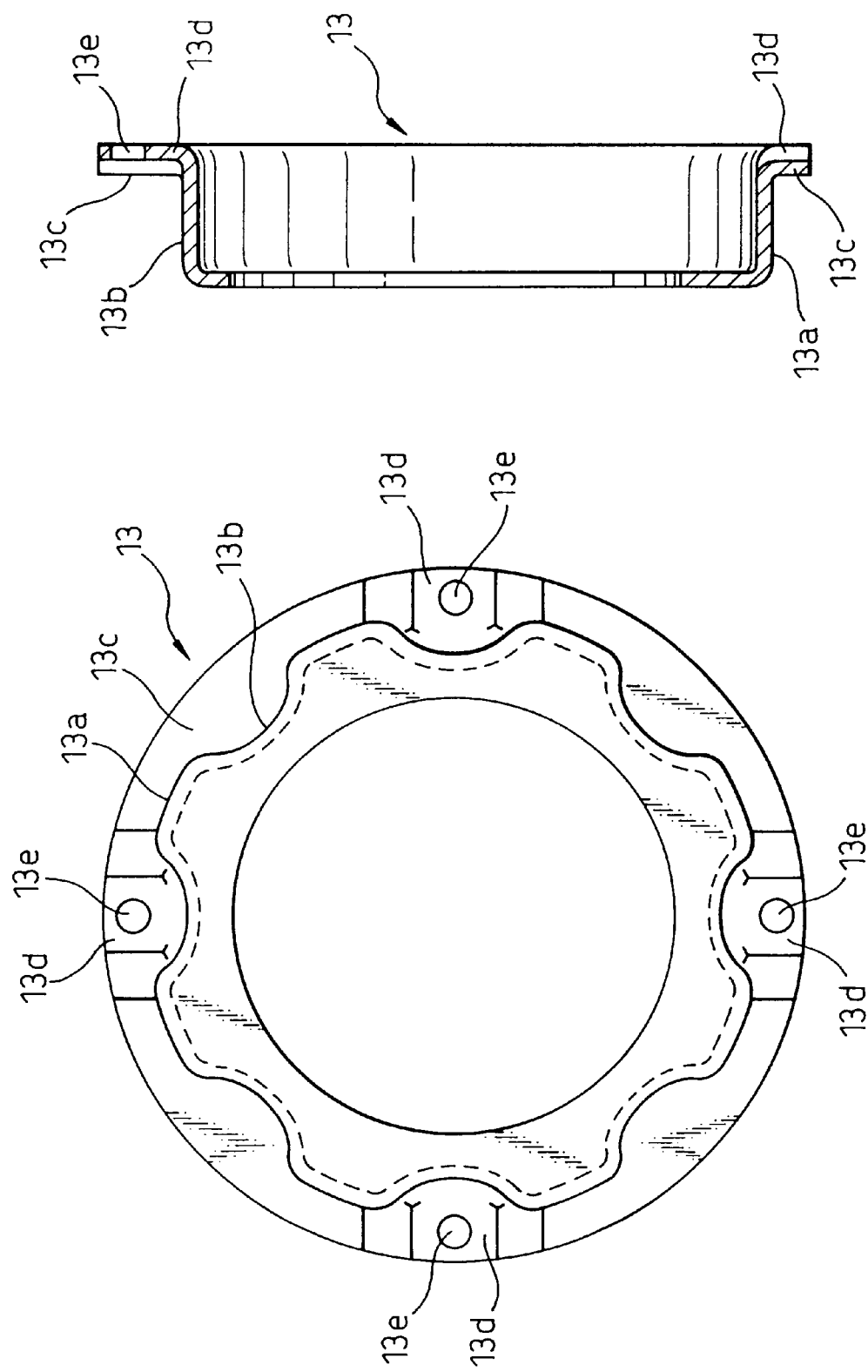

DEVICE FOR TRANSMITTING ROTATIONAL POWER

Cross-reference to Related Application

Reference is made to commonly assigned U.S. Pat. No. 5,683,299 entitled "A DEVICE FOR TRANSMITTING ROTATIONAL POWER".

BACKGROUND OF THE INVENTION

1. Field of the Invention

The invention relates to a device for transmitting rotational power from a rotational power source such as an automobile engine to a rotational driven device such as a refrigerant compressor for an air conditioner. The device can rotationally separate the driven device from the rotational power source when the torque transmitted exceeds a predetermined value, that is, the device functions as a torque limiter.

2. Description of the Related Art

Japanese Examined Utility Model Publication (Kokoku) No. 6-14104 describes a rotational power transmission device which has a torque limiting function. The device comprises a drive member which is connected to the crank shaft of an automobile engine through a belt, a driven member which is connected to a shaft of a compressor, and a connecting mechanism between the drive and driven members, which mechanism is provided with levers of rigid material and a spring which is made of a metallic material, in the form of a ring, which engages the levers. The drive member is rotationally connected to the driven member by the engagement between the levers and the spring.

When the drive shaft of the compressor is locked by a failure such as seizing in the compressor and the torque on the connecting mechanism exceeds a predetermined level, the drive levers apply a force on the spring to deform the spring. The deformation of the spring disconnects the engagement between the levers and the spring.

The prior art rotational power transmission device, however, cannot absorb a fluctuation in the torque applied to the device since a metallic spring is used to connect the drive member to the driven member. Therefore, in order to absorb a fluctuation in torque, an additional device must be provided, which increases the production cost.

Further, in an automobile, a driven device, such as a compressor is generally driven by a rotational power transmitted from a crank pulley of the automobile engine through a belt. Therefore, in order to protect the belt from damage, it is desired to have a relatively low shut off torque, for example, 60 Nm, at which the rotational power transmitting device disconnects or disengages.

SUMMARY OF THE INVENTION

The invention is directed to solve the above mentioned prior art problems, and the objective of the invention is to provide a rotational power transmission device with a torque limiting function which can absorb a fluctuation in torque that is to be transmitted.

Further, the objective of the invention is to provide a rotational power transmission device with a relatively low level shut off torque, which can be used to transmit a rotational power from an automobile engine to an driven device, such as a compressor for compressing a refrigerant in an automobile air conditioning system, through a belt.

Further, the objective of the invention is to improve a rotational power transmission device which can function to absorb the fluctuation in torque transmitted and to shut off the transmission of a rotational power when the torque on the rotational power transmission device exceeds a predetermined value, that is an actuation torque, in which an improvement is made to allow setting of the resonance frequency of the rotational transmission device suitably for a device to which the rotational power transmission device is applied while the actuation torque is kept to a constant value.

According to the invention a device for transmitting a rotational power from an automobile engine to a compressor for use in an automobile air conditioning system is provided. The compressor includes a housing and a drive shaft which extends along the axis of the housing. The drive shaft is supported by a bearing on the housing for rotation about the axis of the housing. The device for transmitting a rotational power comprises a pulley, which is supported by a bearing on the housing for rotation about the axis of the housing, for receiving a rotational power from the automobile engine through a V-belt extending between the pulley and the automobile engine, a hub connected to the drive shaft, and means for rotationally connecting the pulley and hub.

The connecting means comprises at least one elastic member with defined outer and inner peripheral surfaces. A first holder member is provided along the outer periphery of the hub for holding the at least one elastic member at the radially outer periphery of the at least one elastic member. A second holder member which is connected to the pulley is provided for holding the at least one elastic member at the radially inner periphery of the at least one elastic member.

The first and second holder members radially cooperate with each other to circumferentially hold the at least one elastic member during normal operation to transmit the rotation. The first and second holder members are disconnected by the deformation of the at least one elastic member when a relative rotation between the pulley and drive shaft occurs. The at least one connecting member and the first holder member defines a relief clearance therebetween for facilitating the deformation of the at least one connecting member when a relative rotation between the pulley and drive shaft occurs.

According to one feature of the invention, the first holder member defines a peripheral surface which is substantially complementary to the outer peripheral surface of the elastic member. The second holder member defines a peripheral surface which is substantially complementary to the inner peripheral surface of the elastic member. The first and second holder members radially cooperate with each other to circumferentially hold the at least one elastic member during normal operation to transmit the rotation.

According to another feature of the invention, at least one of the first and second holder members defines a peripheral surface with a plurality of outwardly convex and concave portions alternatively arranged along at least one of the outer and the inner periphery.

According to another feature of the invention, the at least one elastic member is substantially made into a ring shape, and includes a base portion substantially in the form of a ring, and a peripheral surface with a plurality of outwardly convex and concave portions alternatively arranged along at least one of the outer and the inner periphery which substantially to complement to the peripheral configuration of at least one of the first and second holder members. The outwardly convex portions have an axial length longer than that of the base portion, shorter than that of the base portion, or equal to that of the base portion. Selecting the axial length of the outwardly convex portions relative to that of the base portion allows the rotational power transmission device to perform the desired torque limiter and vibration absorption functions.

DESCRIPTION OF THE DRAWINGS

These and other objects and advantages and further description will now be discussed in connection with the drawings in which:

FIG. 6 illustrates the characteristics of the torque fluctuation absorption according to the invention;

FIG. 7A is a partial front view of the elastic connection member according to an embodiment of the invention;

FIG. 7B is a side end view of the elastic connection member shown in FIG. 7A along VII—VII;

FIG. 8 is an illustration similar to FIG. 6 for explaining the change in characteristics according to the configurations of the elastic connection member;

FIG. 9A is a partial front view similar to FIG. 7A according to another embodiment of the invention;

FIG. 9B is a side end view of the elastic connection member shown in FIG. 9A along IX—IX;

FIG. 10A is a partial front view similar to FIG. 7A according to another embodiment of the invention;

FIG. 10B is a side end view of the elastic connection member shown in FIG. 10A along X—X;

FIG. 11A is a front view of the second holder member according to another embodiment, in which four elastic connection members substantially in the form of a sector are indicated by oblique lines;

FIG. 11B is a side end view of the second holder member with the connection members along line XI—XI in FIG. 11A;

FIG. 12A is a front view of the second holder member of FIGS. 11A and 11B;

FIG. 12B is side end view of the second holder member along line XII—XII in FIG. 12A;

DESCRIPTION OF THE PREFERRED EMBODIMENTS

Figure 1:
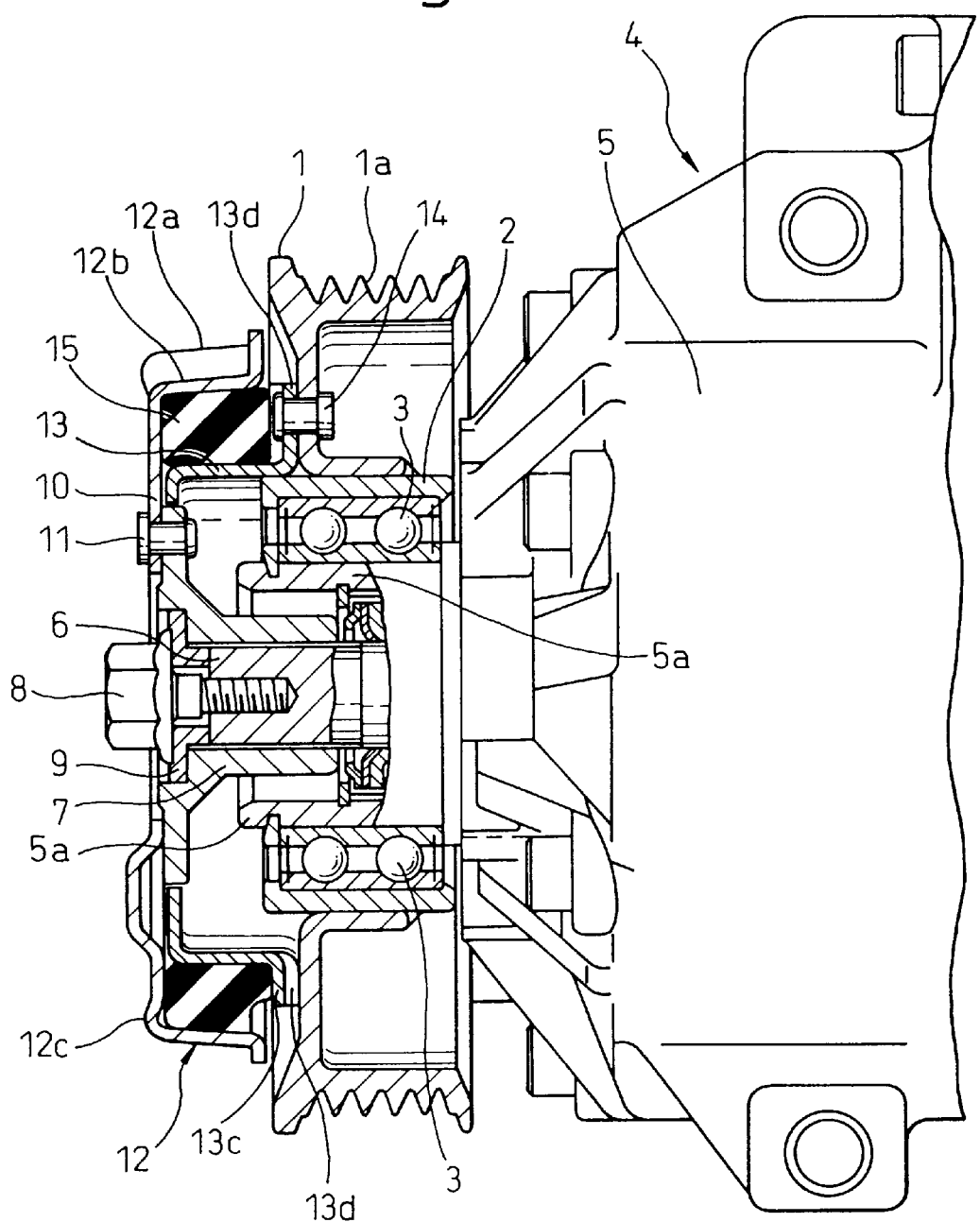
FIG. 1 is a partial section, along line I—I in FIG. 2, of the device for transmitting rotational power according to an embodiment of the invention in which the device is mounted to a drive shaft of a compressor for use in an automobile air conditioning system.
Figure 2:
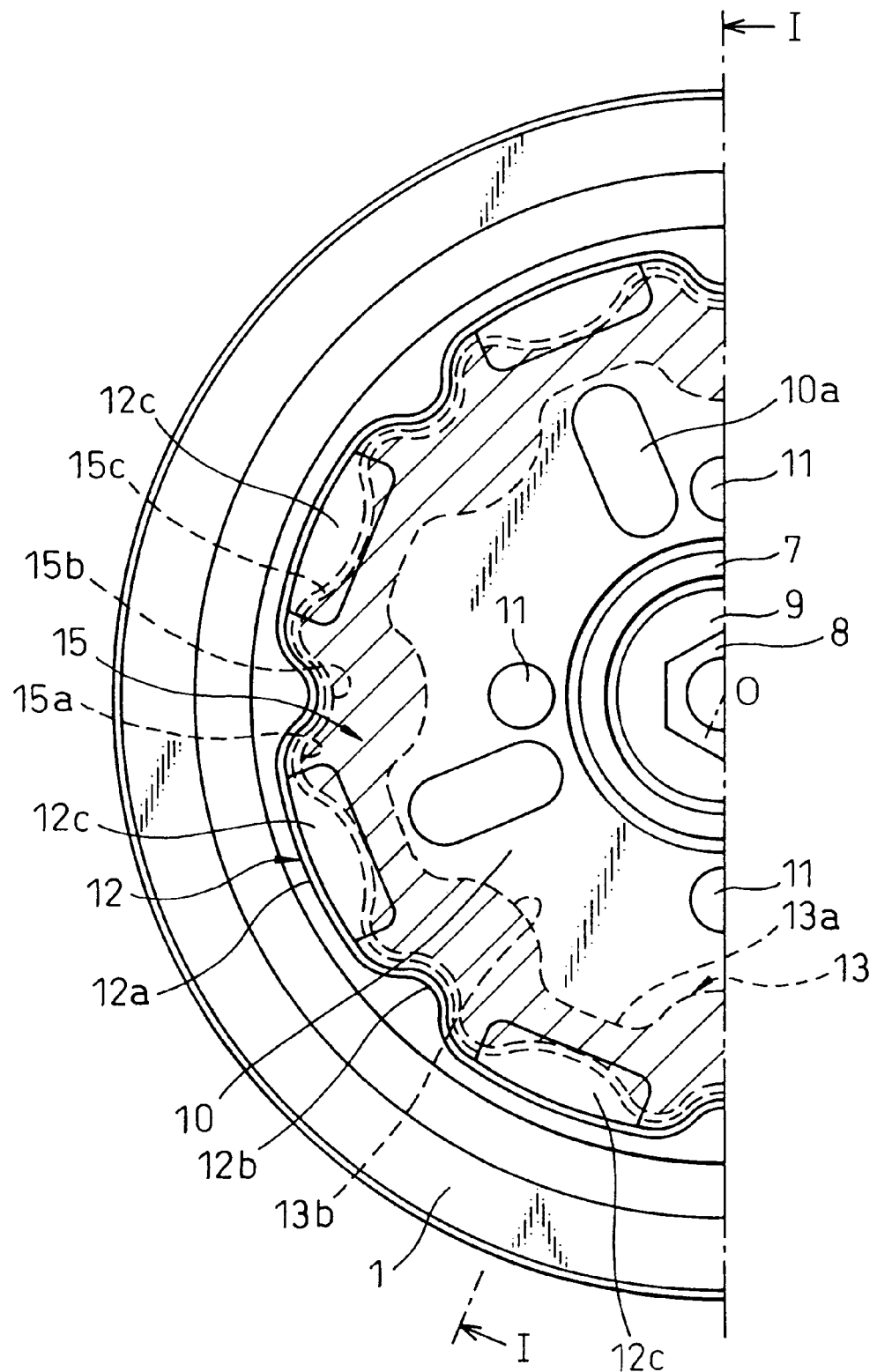
FIG. 2 is a partial front view of the device of FIG. 1 in which the elastic connection member is indicated by oblique lines.

With reference to FIGS. 1 and 2, a rotational power transmission device according to the first embodiment of the invention comprises a pulley 1 for receiving a rotational driving power from an automobile engine (not shown) as a rotational power source. The pulley 1 includes a rim 1a with a plurality of V-shaped grooves adapted to engage V-shaped belts 21 (FIG. 5), and is operationally connected to a crank shaft (FIG. 5) of the automobile engine through V-shaped belts 21.

Figure 5:
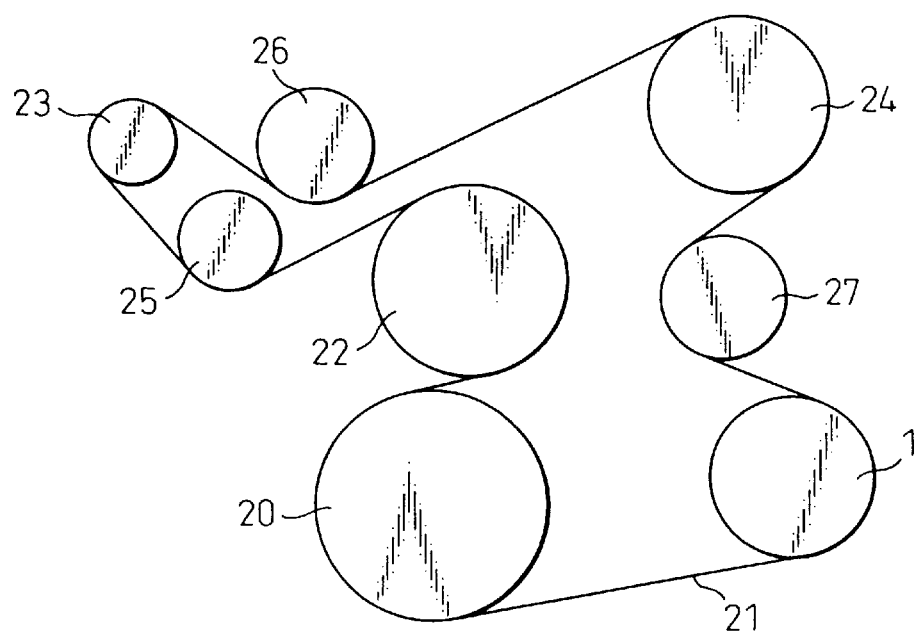
FIG. 5 illustrates a system diagram of devices on an automobile engine to which the device of the invention is applied.
Figure 13:
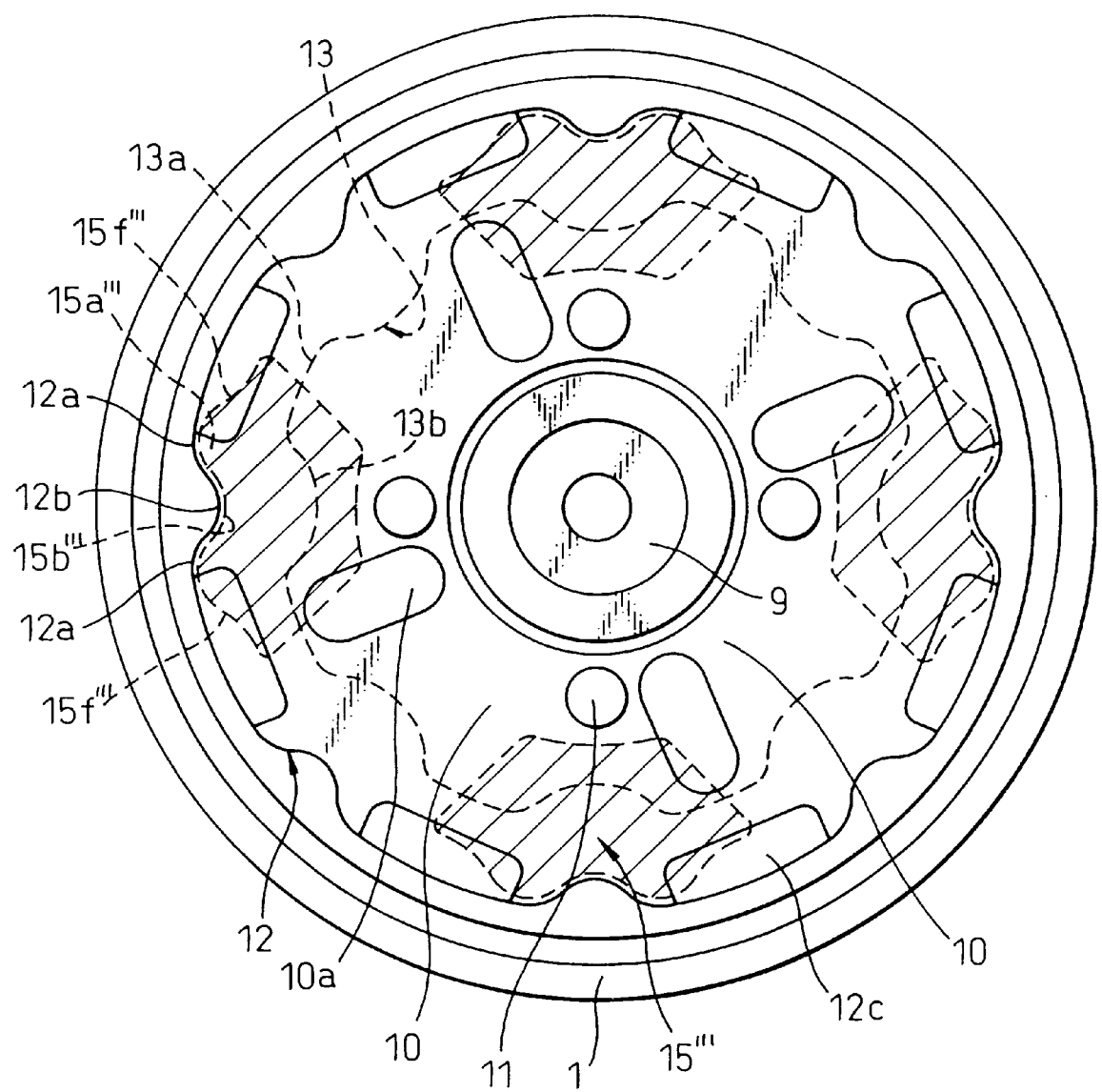
FIG. 13 is a front view similar to FIG. 2 of the embodiment of FIGS. 11A—12B.
Figure 14:
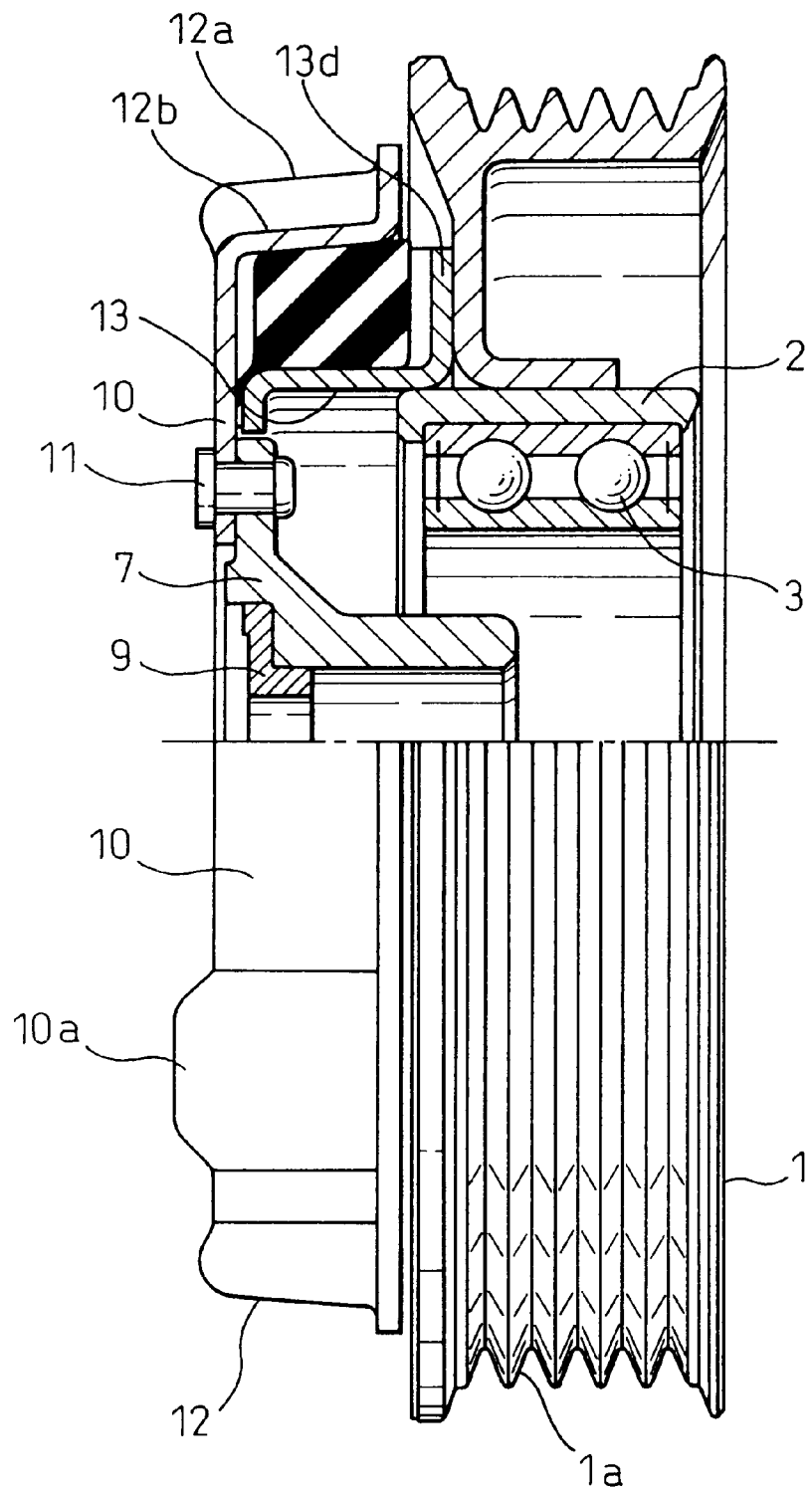
FIG. 14 is a partial section similar to FIG. 1 along line XIV—XIV in FIG. 13.

FIG. 5 illustrates an example of a drive system for devices on the automobile engine. The system includes a crank pulley 20 which is connected to the crank shaft of the automobile engine. The belts 21 extend from the crank pulley 20 via water pump pulley 22 of a water pump in a cooling system of the automobile engine, an alternator pulley 23 of an alternator for charging a battery, a hydraulic pump pulley 24 of a hydraulic pump for a power steering system, and the pulley 1. Tension pulleys or idle pulley 25, 26 and 27 are provided for applying a tension to the belt 21.

With reference to FIGS. 1 and 2 again, the pulley 1 is connected to a rotor 2 by an appropriate connecting method such as welding. The rotor 2 is mounted on a cylindrical support 5a, which outwardly extends from a front housing 5 of a compressor 4 as a driven device, by a bearing 3 for rotation. The compressor 4 is of a variable displacement type for use in an automobile air conditioning system (not shown). The compressor 4 comprises a front housing 5a and a rear housing (not shown) connected to each other to form a cylinder block including a plurality of parallel cylinder bores disposed about the axis. A drive shaft 6 extends through the cylinder block along the axis. Connected to the drive shaft 6 through a swash plate (not shown) are reciprocating pistons (not shown) to be provided within the cylinder bores. Changing the angle of the swash plate changes the displacement of the compressor 4 within a range of 0–100% continuously. Using a variable displacement type compressor avoids the necessity of an electro-magnetic clutch for on/off operation of the compressor. A detailed description regarding the compressor 4 and the automobile air conditioning system is disclosed in U.S. Pat. No. 5,683, 299, which is incorporated herein by reference, thus no further description is made to avoid redundancy.

The rotational power transmission device further comprises a first hub 7, an end plate 9 and a bolt 8 threadly connected to the end of the drive shaft 6. In particular, the first hub 7 is connected to the drive shaft 6 through a spline connection (not shown) provided on the outer surface of the drive shaft 6 and the inner surface of the first hub 7 to prevent the relative rotation therebetween.

Connected to the first hub 7 by rivets 11 is a second hub 10 which is formed into a ring plate with a cylindrical wall 12 extending along the outer periphery of the second hub 10. The cylindrical wall 12 provides a first holder member. The wall 12 includes a plurality of outwardly convex and concave portions 12a and 12b alternately arranged along the periphery of the second hub 10. The convex and concave portions 12a and 12b provide an engagement force in the peripheral direction as described hereinafter.

Figure 3B:
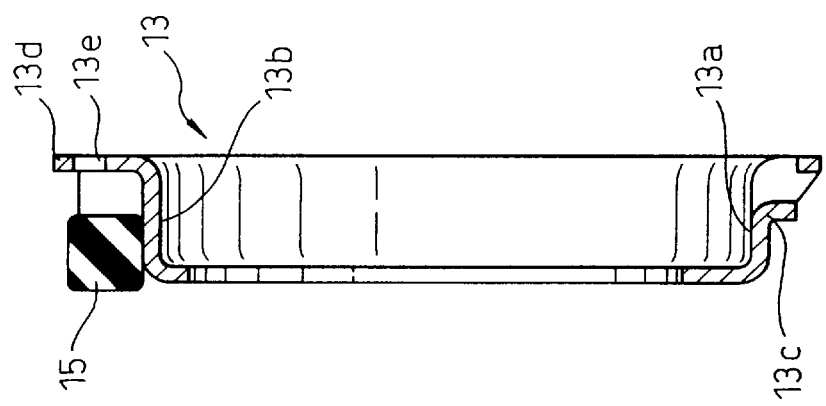
FIG. 3B is a side end view of the second holder member along line III—III in FIG. 3A.
Figure 3A:
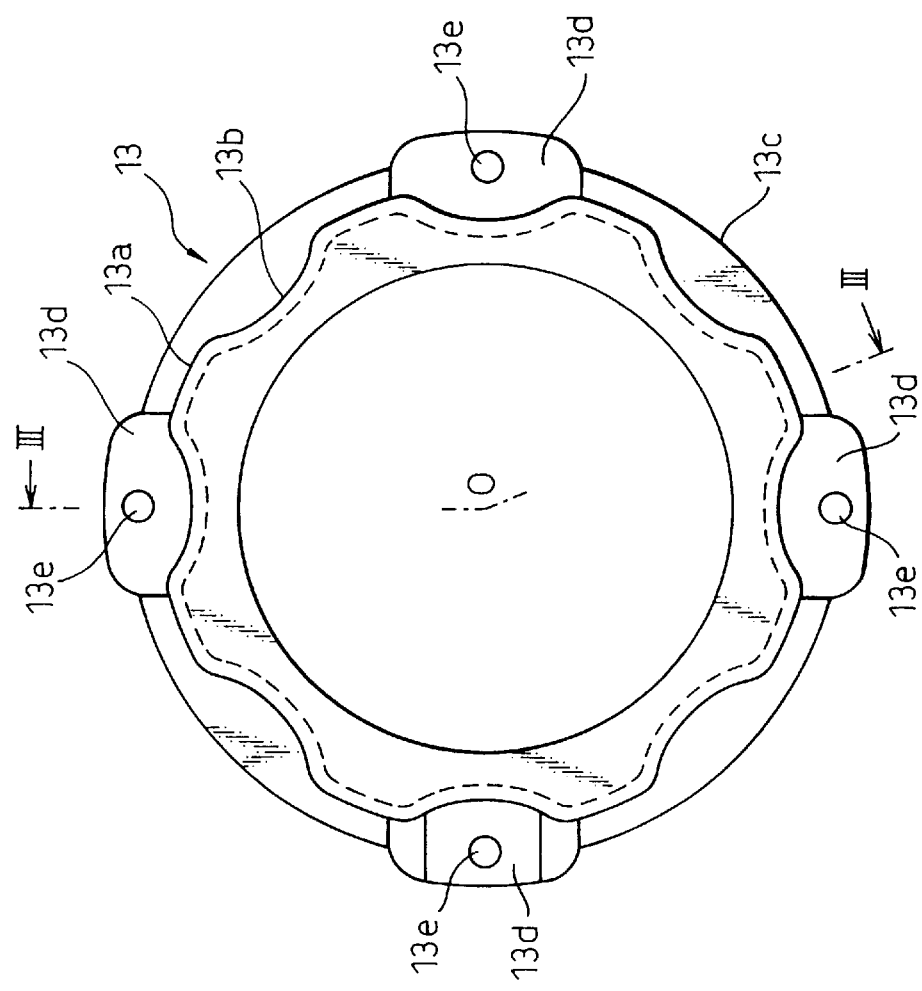
FIG. 3A is a front view of the second holder member according to the embodiment of FIG. 1.
Figure 4:
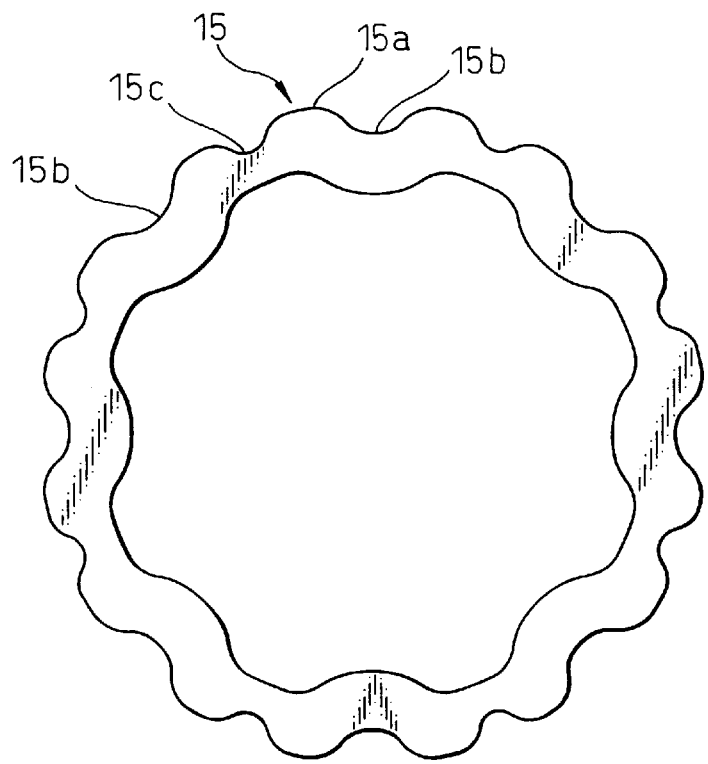
FIG. 4 is a front view of the elastic member according to the embodiment of FIG. 1.

A holder member 13, which provides a second holder member, substantially in the form of a ring, is provided to hold an elastic connection member 15 by cooperation with the cylindrical wall 12 of the second hub 10. The holder member 13, as shown in FIGS. 3A and 3B, also includes a plurality of outwardly convex and concave portions 13a and 13b alternately arranged along its periphery. The holder member 13 further includes clamping portions 13c, for axially clamping the elastic connection member 15 by cooperation with the second hub 10, and flange portions 13d.

The clamping portions 13c have substantially an L-shaped section which includes axial and radial portions. The flange portions 13d also substantially have an L shape section with axial and radial portions. The axial portions of the flange portions 13d extend longer than those of the clamping portions 13c. The flange portions 13d include through holes 13e into which rivets 14 are fitted to mount the holder member 13 to the pulley 1.

The connection member 15 is formed substantially into a ring, which includes a plurality of outwardly convex and concave portions 15a and 15b alternately arranged along its periphery. The connection member 15 is preferably made of an elastic material, which can transfer torque and absorb variations in the torque, within a temperature range for use an automobile (for example, −30 to 120 Celsius degrees. A rubber material is suitable, and more preferably, chlorinated butyl rubber, acrylonitrile-butadien rubber or ethylene-propylene rubber. In FIG. 2, the connection member 15 is indicated by oblique lines.

During assembly, the connection member 15 is clamped between the clamping portions 13c of the holder member 13 and the second hub 10 so that the outwardly convex and concave portions of the connection member 15 are mated to those of the wall 12 of the second hub 10 and of the holder member 13. The radial portions of the clamping portions 13c prevent the connection member 15 from moving in the axial direction. The difference, in the axial length, between the flange portions 13d and the clamping portions 13c of the holder member 13 allows the connection member 15 to be axially separate from the outer end face of the pulley 1, which reduces the contamination on the connection member 15 due to oil from the compressor 4.

The thickness of the connection member 15 is slightly larger than the distance between the second hub 10 and the clamping portions 13c of the holder member 13. Thus, the connection member 15 is pressed therebetween, when assembled, to ensure the engagement with the second hub 10 and the holder member 13 through the convex and concave portions. The positive engagement operatively connects the holder member 13 to the second hub 10. Thus, the rotation is transmitted from the pulley 1 to the drive shaft 6 of the compressor 4 through the holder member 13, the connection member 15, the second hub 10 and the first hub 7.

The connection member 15 further includes a plurality of outwardly concave recesses 15c, on the outwardly convex portions 15a, for aiding the deformation of the connection member 15. The cylindrical wall 12 and the recesses 15c define relieving clearances 12c, which facilitate the deformation of the connection member 15. The clearances 12c also function to relieve the deformation of the connection member 15 during assembly by permitting a portion of the connection member 15 to enter the clearances so that the dimensional tolerance of the parts is compensated for to ensure the predetermined shut off torque. Selecting the size and configuration allows a designer to set a shut off torque at which the connection member 15 deforms to disconnect the rotational power transmission from the holder member 13 to the second hub 10.

The operational function of the embodiment will be described.

The rotation of the crank pulley 20 (FIG. 5) of the automobile engine is transmitted to the pulley 1 through the belt 21 (FIG. 5). The second hub 10 is rotated through the positive engagement between the connection member 15 and the holder member 13, and the connection member 15 and the wall 12 of the second hub 10. Thus, the drive shaft 6 of the compressor 4 is rotated by the rotating pulley 1 through the holder member 13, the connection member 15 and the wall 10 of the second hub 10.

During the normal operation of the compressor 4, a torque, in general 20 Nm, about the drive shaft 6 is applied to the connection member 15. The elastic connection member 15 can absorb a fluctuation in the torque. With reference to FIG. 6, an illustration of the effect of the absorption of the torque fluctuation by the elastic connection member 15 is shown in comparison with the prior art in which metallic springs are used to connect a pulley and a drive shaft of a compressor. In FIG. 6, the horizontal axis is the rotation of the compressor 4, and the vertical axis is the half amplitude of a fluctuation in the torque on the drive shaft 6 of the compressor 4. The torque fluctuation, when the elastic connection member 15 is used, is shown by curve I as a solid line, while the torque fluctuation in the prior art is shown by curve II as a broken line. As shown in FIG. 6, the peak of the torque fluctuation is shifted to lower rotation speed and the amount of the fluctuation is reduced by the invention, which results in a reduction of vibrations of the compressor.

When the drive shaft 6 is locked due to the failure in the compressor 4, such as seizing, the elastic connection member 15 deforms to disconnect the positive engagement by the convex and concave portions of the connection member 13, of the holder member 15 and the wall 12 of the second hub 10. At this time, the clearances 12c provides a large deformation of the connection member 15 by allowing the deformed portion to enter therein so that the deformation is facilitated.

During the deformation and disconnection of the connection member 15, the rotation of the pulley 1 does not stop, which results in the connection member 15 engaging again. When the failure is slight and the drive shaft 6 is locked temporarily, the engaged connection member 15 can transmit the rotation to the drive shaft 6. Thus, the compressor 4 can operate again automatically. When a significant failure occurs in the compressor 4 and the drive shaft 6 is permanently locked, the wear and tear on the connection member 15 completely separates the drive shaft 6 from the pulley 1. Thus, the failure on belts 21 or the other devices 22, 23 and 24 for the automobile engine is prevented.

With reference to FIGS. 7A and 10B, three embodiments of the invention regarding the configuration of the elastic connection member 15 are illustrated, in which the similar components are indicated by the same reference numbers in FIGS. 1–3.

The connection member 15 provides a torque limiter function as described above by its deformation. In particular, the outwardly convex portions 15a which are at the front side of the corresponding clearances 12c relative to the rotational direction are pressed to the corresponding concave portions 12b of the wall 12 so that the convex portions deform to the reward direction to enter the corresponding clearances 12c. At the same time, the outwardly convex portions resist deformation due to the spring constant. Thus, the size and configuration of the outwardly convex portions 15a define the torque limiter function under a spring constant. Further, the volume of the clearances 12c, which is defined by the size and configuration of the outwardly convex portions 15a, also defines the degree of the deformation, which also defines the torque limiter function. On the other hand, a base portion 15e in the form of a ring, which is radially inside of a circle of the envelope, defined by connecting the bottoms of the outwardly concave portions 15b, primarily functions to absorb the fluctuation in the torque.

According to the invention, selecting the axial lengths of the outwardly convex and base portions 15a and 15e, respectively, allows the rotational power transmission device to perform the desired torque limiter and vibration absorption functions. In the embodiment illustrated in FIGS. 7A and 7B, the axial length L1 of the outwardly convex portions 15a is shorter than the axial length L2 of the base portion 15e. In the embodiment illustrated in FIGS. 9A and 9B, the axial lengths L1' and L2' are equal to each other while in the embodiment illustrated in FIGS. 10A and 10B, the axial lengths L1' of the outwardly convex portions 15a' is longer than the axial length L2 of the base portion 15e.

As can be seen in FIG. 8, with the length L1 being constant, the increase in the length L2 of the base portion 15e increases the resonant rotational speed of the compressor 4 for the torque fluctuation since the greater the length L2, the greater the torsional spring constant of the base portion 15e while the shut off torque is substantially kept at a constant value. On the other hand, is may be anticipated that changing the length L1, with the length L2 being constant, changes the shut off torque at which the connection member 15 disengages from the holder member 13 and the wall 12 while the resonance rotational speed of the compressor 4 for the torque fluctuation is substantially kept at a constant value.

In the aforementioned embodiments, the connection member is mounted by clamping it between the second hub 10, the wall 12 and the holder member 13. However, the connection member can be mounted by adhesively securing to at least one of the wall 12 and the holder member 13. Described below with reference to FIGS. 11–14 is another embodiment of the invention, in which the connection member is adhesively secured to the holder member. The components similar to those in the aforementioned embodiments are indicated by the same reference numbers.

The embodiment shown in FIGS. 11–14 comprises four connection members 15''' which are made of an elastic material in the form of sectors, in stead of a ring as in the aforementioned embodiments, and provided at angular intervals about the axis. Each of the sector connection members 15''' includes a base portion 15e''', a pair of outwardly convex portions 15a and an outwardly concave portion 15b''' provided therebetween. The number of the outwardly convex and concave portions 15a''' and 15b''', which are alternatively provided, can be advantageously selected. The outwardly convex and concave portions 15a''' and 15b''' cooperate with the corresponding convex and concave portions 12a and 12b as in the aforementioned embodiments.

The sector connection members 15''' further include a flap portion 15d''' which is formed in one piece to the base portion 15e''' to cooperate with the end face of the holder member 13 for increasing the adhesion bond. An adhesive agent is applied to the radially inner surface of the base portion 15e''' and to the hidden surface of the flap portion 15d'''. The outwardly convex portions 15e''' include slants 15f'''. Provided between the slants 15f''' and the inner surface of the wall 12 are relief clearances 12c which facilitate the deformation of the sector connection members 15''', in particular, the deformation of the convex portions 15a'''.

When the connection members 15''' are adhesively secured to the holder member 13, the radially inner surfaces of the connection members and the radially outer surface of the holder member 13 can be provided in a plane configuration (not shown) instead of the outwardly convex and concave configuration since they are adhesively secured to each other. In this case, the pulley 1 and the drive shaft 6 of the compressor 4 are operatively disconnectably connected by only the positive engagement between the radially convex and concave configuration between the elastic connecting members 15''' and the wall 12 of the second hub 10.

Further, the connection members 15''' can be adhesively secured to the wall 12 instead of the holder member 13. In this case, the radially outer surfaces of the connection members and the radially inner surface of the wall 12 can be provided in a plane configuration (not shown) instead of the outwardly convex and concave configuration since they are adhesively secured to each other.

In the aforementioned embodiments shown in FIGS. 1–14, the holder member 13 is connected to the pulley 1 to engage the connection member(s) 15 at the radially inner periphery of the connection member(s) 15, and the wall 12 of the second hub 10 is connected to the first hub 9 so that the wall 12 engage the connection member(s) 15 at the radially outer periphery of the connection member(s) 15. However, the wall 12 and the holder member 13 can be provided vice versa, that is, the wall 12 and the holder member 13 can be provided to engage the connection member(s) 15 at the radially outer and inner periphery of the connection member(s) 15, respectively.

It will also be understood by those skilled in the art that the forgoing description is a preferred embodiment of the disclosed device and that various changes and modifications may be made without departing from the spirit and scope of the invention.

We claim:

1. A device for transmitting a rotational power from an automobile engine to a compressor for use in an automobile air conditioning system, the compressor including a housing and a drive shaft extending along the axis of the housing, the drive shaft being supported by a bearing on the housing for rotation about the axis of the housing, the device for transmitting a rotational power comprising:

a pulley supported by the bearing on the housing for rotation about the axis of the housing, for receiving a rotational power from the automobile engine through a V-belt extending between the pulley and the automobile engine;

a hub connected to the drive shaft;

connecting means for rotationally connecting the pulley and hub, the connecting means comprising:

at least one elastic member with defined outer and inner peripheral surfaces;

a first holder member, defined along the outer periphery of the hub, for holding the at least one elastic member at the radially outer periphery of the at least one elastic member; and a second holder member, connected to the pulley by holding the bearing for rotationally supporting the pulley on the housing and for holding the at least one elastic member at the radially inner periphery of the at least one elastic member, wherein the at least one elastic member is made of an elastic material that is deformable and releasable from at least one of the first and second holder members when a relative rotation between the pulley and drive shaft occurs, wherein the first holder member defines a peripheral surface, the peripheral surface of the first holder being substantially complementary to the outer peripheral surface of the elastic member;

the second holder member defines a peripheral surface, the peripheral surface of the second holder being substantially complementary to the inner peripheral surface of the elastic member, the first and second holder members radially cooperating with each other to circumferentially hold the at least one elastic member during normal operation to transmit the rotation, and being disconnected by the deformation of the at least one elastic member when a relative rotation between the pulley and drive shaft occurs, wherein the peripheral surface defined by at least one of the first and second holder members has a plurality of outwardly convex and concave portions alternately arranged therealong, wherein the at least one elastic member includes a base portion substantially in the form of a ring, and at least one of the outer and the inner peripheral surface of the elastic member has a plurality of outwardly convex and concave portions alternately arranged therealong that are substantially complementary to outwardly convex and concave portions of the peripheral surface of said at least one of the first and second holder members, the outwardly convex portions of the elastic member having an axial length shorter than that of the base portion.

2. A device for transmitting a rotational power according to claim 1 in which the at least one member comprises sector member provided between the first and second holder members at angular intervals about the axis of the housing.

* * * * *